United States Patent
Schuster

(10) Patent No.: US 10,082,223 B1
(45) Date of Patent: Sep. 25, 2018

(54) VALVE WITH SLEEVE

(71) Applicant: Cool Tech Industries, LLC, Eden, UT (US)

(72) Inventor: Andrew Schuster, Eden, UT (US)

(73) Assignee: COOL VALVE, LLC, Eden, UT (US)

( * ) Notice: Subject to any disclaimer, the term of this patent is extended or adjusted under 35 U.S.C. 154(b) by 0 days.

(21) Appl. No.: 15/700,894

(22) Filed: Sep. 11, 2017

(51) Int. Cl.
| | | |
|---|---|---|
| *F16K 31/54* | (2006.01) | |
| *F16K 5/06* | (2006.01) | |
| *F16K 31/44* | (2006.01) | |
| *F16K 31/53* | (2006.01) | |

(52) U.S. Cl.
CPC ............ *F16K 31/54* (2013.01); *F16K 5/0647* (2013.01); *F16K 31/445* (2013.01); *F16K 31/535* (2013.01)

(58) Field of Classification Search
CPC ...... F16K 31/54; F16K 5/0647; F16K 31/445; F16K 31/535
USPC ...................... 251/315.01, 228, 248, 341, 345
See application file for complete search history.

(56) References Cited

U.S. PATENT DOCUMENTS

| | | | | | |
|---|---|---|---|---|---|
| 4,332,267 A | * | 6/1982 | Evans | ................... | E21B 23/006 137/1 |
| 4,466,461 A | * | 8/1984 | Weiss | ...................... | F16K 3/265 137/625.3 |
| 4,565,213 A | * | 1/1986 | Giebeler | ................ | E21B 21/10 137/494 |
| 4,568,059 A | * | 2/1986 | Kawase | ................. | F16K 5/0626 251/315.13 |
| 4,871,019 A | * | 10/1989 | Haley | ..................... | E21B 34/14 166/167 |
| 5,396,922 A | * | 3/1995 | Ottens | ................... | F16K 5/0626 137/454.2 |
| 6,951,331 B2 | | 10/2005 | Haughom | | |
| 7,140,645 B2 | | 11/2006 | Cronley | | |
| 2004/0130144 A1 | | 7/2004 | Cronley | | |
| 2005/0247902 A1 | * | 11/2005 | Dreier | ................... | F16K 5/0647 251/315.01 |
| 2008/0169441 A1 | * | 7/2008 | Beebe | ................... | F16K 5/0642 251/248 |
| 2010/0025611 A1 | * | 2/2010 | Mazzacano | .......... | F16K 5/0647 251/292 |
| 2010/0326647 A1 | * | 12/2010 | Moody, V | ............... | E21B 19/16 166/77.51 |
| 2013/0175463 A1 | * | 7/2013 | Burgess | ................ | F16K 31/041 251/129.03 |

FOREIGN PATENT DOCUMENTS

| | | |
|---|---|---|
| CN | 206347134 U | 7/2017 |
| DE | 102013009195 A1 | 12/2014 |
| EP | 1236948 B1 | 9/2002 |

* cited by examiner

*Primary Examiner* — Kevin Murphy
*Assistant Examiner* — Kelsey Cary
(74) *Attorney, Agent, or Firm* — Fabian VanCott; Jeffrey K. Riddle

(57) ABSTRACT

A valve that includes a housing, a ball having a channel passing therethrough, the ball housed within the housing, a stem extending out from a surface of the ball perpendicular to the channel, a gear coupled to the stem, the gear comprising a number of teeth, and a sleeve having a racked channel defined on an interior surface of the sleeve that interfaces with the teeth of the gear.

18 Claims, 7 Drawing Sheets

US 10,082,223 B1

VALVE WITH SLEEVE

BACKGROUND

Valves are used to regulate the flow of a fluid through a passageway. Varying fluidic flows may be created by selective actuation of the valve. in some instances, relatively higher or relatively lower fluidic pressures may be achieved through the value based on how open the valve is.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
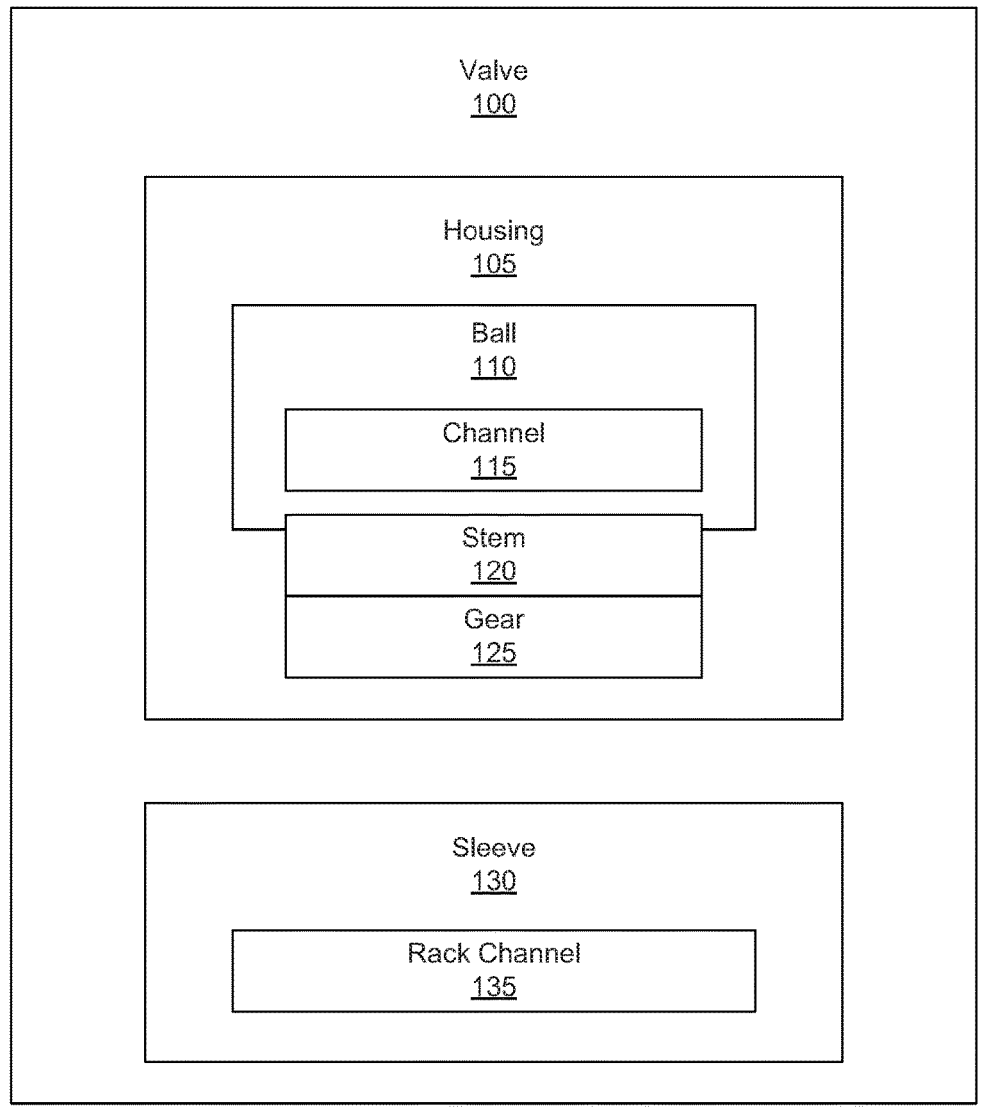
FIG. 1 is a block diagram of a valve according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As mentioned above, valves allow a user to cause a fluid to pass or not pass through a fluidic channel. In some instances, the valves may vary the flow of fluid that passes the valve based on how far the valve is opened. Many different valves may be used, but generally these valves may be difficult for a user to open or close. Additionally, some parts of the valves, especially with ball valves, may break. In the example of a ball valve, a stem and handle used to turn the ball may be particularly vulnerable to breakage and an often-used ball valve may often require repairs to the control valve or other parts.

A ball valve may be used to allow fluid flow on a device that is to be held by a user. As an example, a ball valve may be used on a high-pressure hose. In attempting to actuate the handle in order to turn the ball within the ball valve, a user must release at least one hand from the high-pressure hose. In this scenario, a user may find it difficult to control the high pressures of the hose with a single hand.

The present specification, therefore, describes a ball valve that is not opened by use of a lever coupled to the stem of the ball valve. Instead, the present specification describes a valve that includes a housing, a ball having a channel passing therethrough, the ball housed within the housing, a stem extending out from a surface of the ball perpendicular to the channel, a gear coupled to the stem, the gear comprising a number of teeth, and a sleeve having a racked channel defined on an interior surface of the sleeve that interfaces with the teeth of the gear. This valve allows a user to maintain a two-hand grip on the sleeve of the valve while also actuating the valve in order to open or close the valve. Additionally, since the valve described in the present specification does not implement those parts of the ball valve that may break due to user interaction.

The present specification further describes a ball valve assembly that includes a ball valve housing to house a ball, the ball comprising a channel defined along a first axis of the ball, a stem coupled to the ball at a second axis perpendicular to the channel, a gear coupled to the stem, the gear having a number of teeth, and a sleeve coaxially covering the housing, the sleeve comprising a rack to interface with the teeth of the gear.

The present specification also describes a fluid channel that includes a ball valve, the ball valve including a ball valve housing to house a ball, the ball comprising a channel defined along a first axis of the ball, a stem coupled to the ball at a second axis perpendicular to the channel, a gear coupled to the stem, the gear having a number of teeth, and a sleeve coaxially covering the housing, the sleeve comprising a rack to interface with the teeth of the gear.

As used in the present specification and in the appended claims, the term "fluid" is meant to be understood as any substance that deforms under an applied shear stress. Examples of fluids include liquids, gases, plasmas, and plastic solids, among other substances.

Additionally, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a valve (100) according to an example of the principles described herein. The valve (100) may include a housing (105) with the housing including a ball (110) having a channel (115) defined therethrough. The housing (105) may further include a stem (120) coupled to the ball (110) and a gear (125) coupled to the stem (120). The valve (100) may also include a sleeve (130) that is formed coaxially around the housing (105) with a racked channel (135) defined on an interior surface of the sleeve (130). These elements will now be described in more detail in connection with FIG. 2 and FIG. 3.

Figure 2:
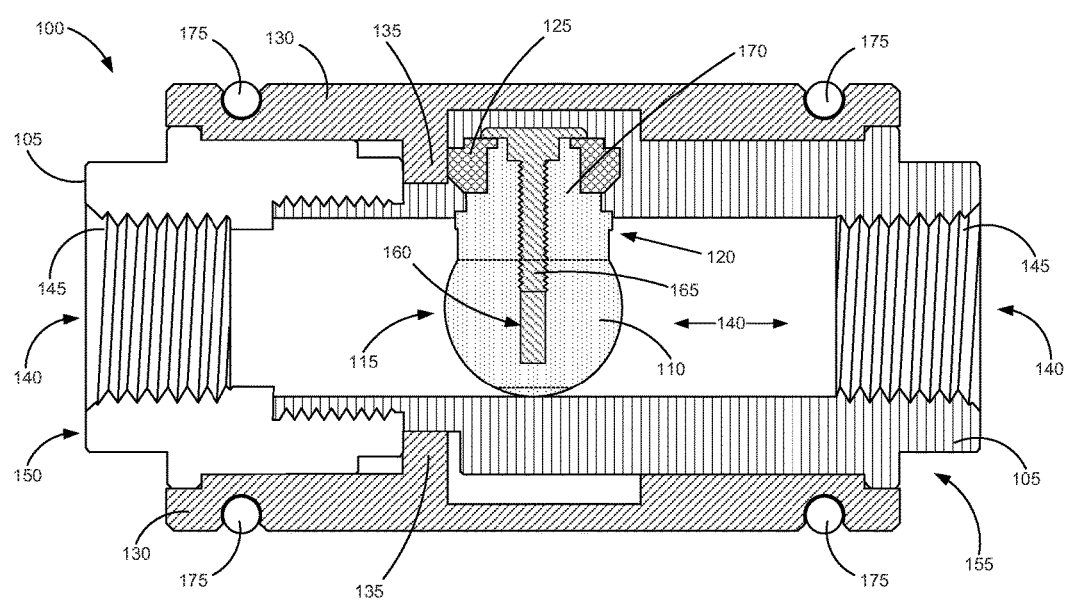
FIG. 2 is a cutout view of the valve of FIG. 1 according to an example of the principles described herein.
Figure 3:
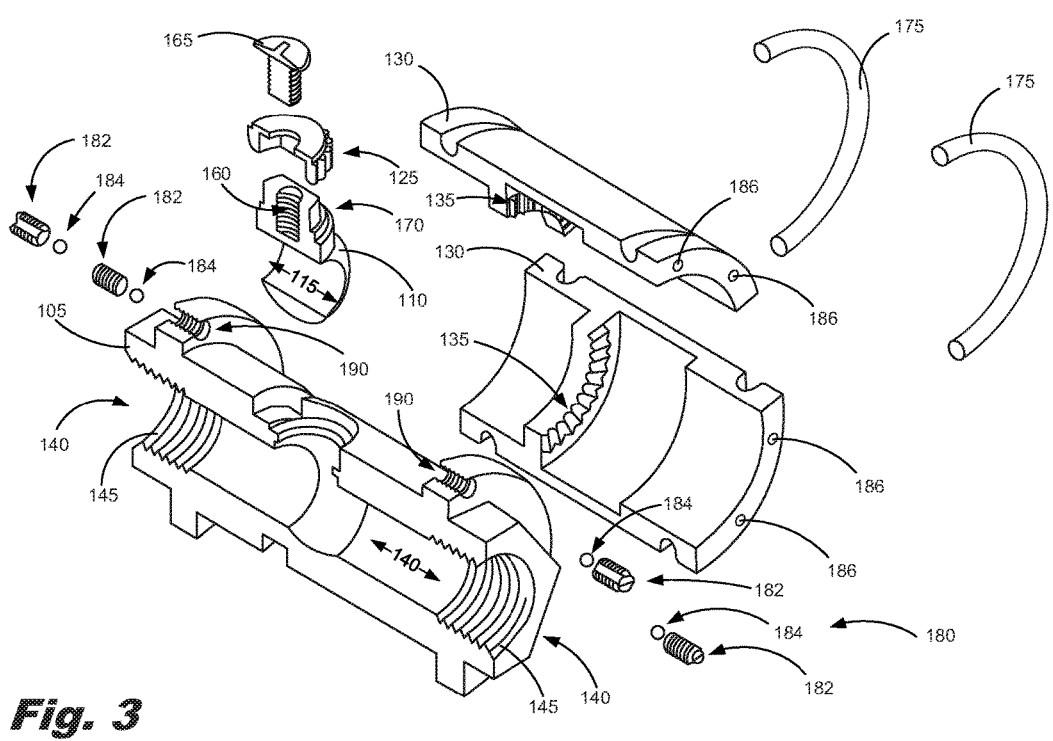
FIG. 3 is an exploded cutout view of the valve of FIG. 1 according to an example of the principles described herein.

FIGS. 2 and 3 are a cutout view of the valve (100) of FIG. 1 and an exploded cutout view of the valve (100) of FIG. 1, respectively, according to an example of the principles described herein. The valve (100) shown in FIG. 2 has been cut along a plane along which a fluid may flow through a fluid channel (140). In order to couple the valve (100) to a number of pipes, threading (145) may be provided on an interior surface of the fluid channel (140) of the housing (105).

The housing (105) may be made of any resilient material that allows a fluid to flow therethrough as well as counteract pressures caused a fluid source when the flow of fluid is stopped by the valve (100) and, specifically, the ball (110). In some examples, and in the example shown in FIG. 2 the housing (105) may comprise of a first housing part (150) and a second housing part (155). The first housing part (105) and second housing part (155) may be coupled together using, in an example, threaded interfaces. The use of the two first housing part (105) and second housing part (155) may allow a user to dismantle the valve (100) if and when parts of the valve (100) may be repaired or cleared of debris. In an example, a number of rails may be defined in the housing (105). The number of rails being defined in the housing (105) may interface with a number of racked channels (135) defined on an inner surface of the sleeve (130) as described herein. The racked channels (135) and rails may be used to cause the sleeve (130) to remain rotatable coaxially about the housing (105).

The ball (110) may also be made of a resilient material that counteract pressures caused by a fluid source when the flow of fluid is stopped by the ball (110). As described herein, the ball (110) has a channel (115) defined therein. The channel (115) may share a common axis as that of the fluid channel (140) when the valve (100) and ball (110), specifically, are placed in an open state to allow fluid to flow through the valve (100). In an example, the diameter of the channel (115) may be larger than the diameter of the fluid channel (140). In an example, the diameter of the channel (115) may be smaller than the diameter of the fluid channel (140). In an example, the diameter of the channel (115) may be equal to the diameter of the fluid channel (140). In each of these examples, the total diameter of the ball (110) may exceed the diameter of the fluid channel (140).

In an example, the ball (110) may have a port or some other interface to which the stem (120) may be coupled to the ball (110). In the example shown in FIG. 2, a pilot hole (160) is formed into the ball (110) in order to receive the stem (120). In this example, the stem (120) engages with the ball (110) via a threaded interface between the two. In an example, the stem (120) may be welded to the ball (110). In another example, the ball (110) and stem (120) may be coupled together using any other type of mechanical or adhesive coupling. Thus, the present specification contemplates the use of any coupling device or process used to couple the ball (110) with the stem (120).

The stem (120) may also be made of a resilient material that can resist any torque forces applied to the stem (120) when the ball (110) is turned within the housing (105). As depicted in FIG. 2, the stem (120) is coupled to and extends from the ball (110) at an angle perpendicular to the fluid channel (140) and channel (115) formed in the ball (110). In the example shown in FIG. 2, the stem (120) extends away from the ball (110) and beyond an outer surface of the housing (105). In order to prevent fluid flowing within the fluid channel (140) from escaping via any interface between the ball (110) and stem (120) or stem (120) and housing (105), any number of gaskets, o-rings, and/or waterproof lubricants may be used.

In an example, the stem (120) may be made of a number of pieces. In the example shown in FIG. 2, the stem includes a bolt (165) and a cap portion (170). The bolt (165) may physically couple the cap to the ball (110). In this example, the cap portion (170) may have an outer surface that has a top cross-section of a polygon in order to interface with the gear (125) as will be described herein.

In the example shown in FIG. 3, the cap portion (170) does not exist as a separate element and instead the ball (110) incorporates into a single monolithic piece the cap portion (170). As a consequence, the gear (125) may be secured to the ball (110) using the pilot hole (160) and bolt (165).

The stem (120) may then be mechanically or adhesively coupled to a gear (125). In the example shown in FIG. 2, the gear (125) is mechanically coupled to the stem (120) using a number of interfering faces between the gear (125) and the stem (120). As described herein, the top cross-sectional view of the stem (120) may be in the shape of a polygon. The gear (125) may also have an interior top cross-sectional view having a matching shape of a polygon. In this manner, rotational action of the ball (110) and stem (120) results in similar rotational action of the gear (125).

The sleeve (130) may also be made of a resilient material used to interface with the gear (125) via a racked channel (135). The racked channel (135) may be defined into the interior surface of the sleeve (130) such that the teeth defining the racked channel (135) interface mechanically with the teeth of the gear (125). In the examples show in FIGS. 2 and 3, the racked channel (135) is formed out of an inward extension from the internal surface of the sleeve (130). However, the present specification contemplates the use of any type of gearing mechanism used to transfers rotational movement of the sleeve (130) to rotation movement of the gear (125).

The sleeve (130) may be assembled to the valve (100) in any number of pieces. In the example shown in FIG. 3, the sleeve (130) comprises two sections of a column that are held together and maintained to interface with the gear (125) using a number of circlips (175). However, the sleeve (130) may be held together using any type of fastener and the present specification contemplates the use of those fasteners. In an example, any number of sections of the sleeve (130) may be held together using a number of snap posts and matching holes. The snap posts may include a number of bendable members that, when inserted into the matching holes, bend until they reach an interior cavity within the matching hole and expands back to original shape locking the snap posts into the matching holes. This example provides for less moving parts and the elimination of the above descried circlips (175).

During operation of the valve (100), a user may turn the sleeve (130) coaxially about the housing (105). By doing so, the racked channel (135) interfaces with the gear (125) mounted to the stem (120). The interfacing changes coaxial rotation of the sleeve (130) into axial rotation of the ball (110). Because the ball (110) has a channel (115) defined therethrough, this allows a user to selectively open and close the valve (100) based on the degree to which the user coaxially rotates the sleeve (130). As described above, this allows a user to maintain both hands on the valve (100) thereby allowing for better control of the system. Additionally, because the user is gripping the valve (100) coaxially with the flow of fluid through the fluid channel (140), a user may be better able to control the ejection of the fluid out of the end of the valve (100) such as when a nozzle is coupled to an end of the valve (100).

The sleeve (130) may include a layer of heat resistant material. In this example, an outer surface of the sleeve (130) may be layered with silicone or another heat resistant material. In this example, any heat from the fluid flowing through the fluid channel (140) may be dispersed and the user holding the valve (100) will not be discomforted. The fluids may be heated before passing through the valve (100)

by, for example, a heating unit. Despite any specific examples presented herein, the sleeve (130) may by any type of material that may suit any particular needs of a user. Some example materials include brass, aluminum, silicone, or plastic, among others.

In an example, the sleeve (130) may include a surface texture that increases the surface friction against a user's hands. This surface texturing may include knurling or other types of surface treatments that increase such friction.

In the example shown in FIG. 3, the valve (100) may include a number of haptic feedback devices (180). These haptic feedback devices (180) may include a number of set screws (182), a number of ball bearings (184), and a number of registration dimples (186). The registration dimples may be formed on the top and bottom ends of the sleeve (130). A number of set screw holes (190) may be formed in a portion of the valve (100) that correspond to the number of registration dimples (186). A ball bearing (184) and set screw (182) may be placed in each of the set screw holes (190). Consequently, as the sleeve (130) turns, the ball bearings (184) may be forced against the portion of the sleeve (130) where the registration dimples (186) were formed. A user may feel each of the ball bearings (184) falling into the registration dimples (186) at certain locations along the top and bottom of the sleeve (130). This may indicate a position of the sleeve (130) relative to the valve (100) and, consequently, the position of the ball (110) within the valve (100). In some instances, the haptic feedback devices (180) may indicate a quarter turn, a half turn, a full turn, an eighth of a turn, or any other increment of turning of the sleeve (130) and, hence, the ball (110) within the valve (100).

In another example, a number of raised dimples placed where the registration dimples (186) are shown in FIG. 3 may interface with a number of concave dimples defined on housing the valve (100). In this example, a level of mechanical tolerance may be provided between the sleeve (130) and the housing of the valve (100) such that the raised dimples may pop out of the matching concave dimples on the housing of the valve (100) in order to allow for the coaxial rotation of the sleeve (130) about the housing.

Figure 4:
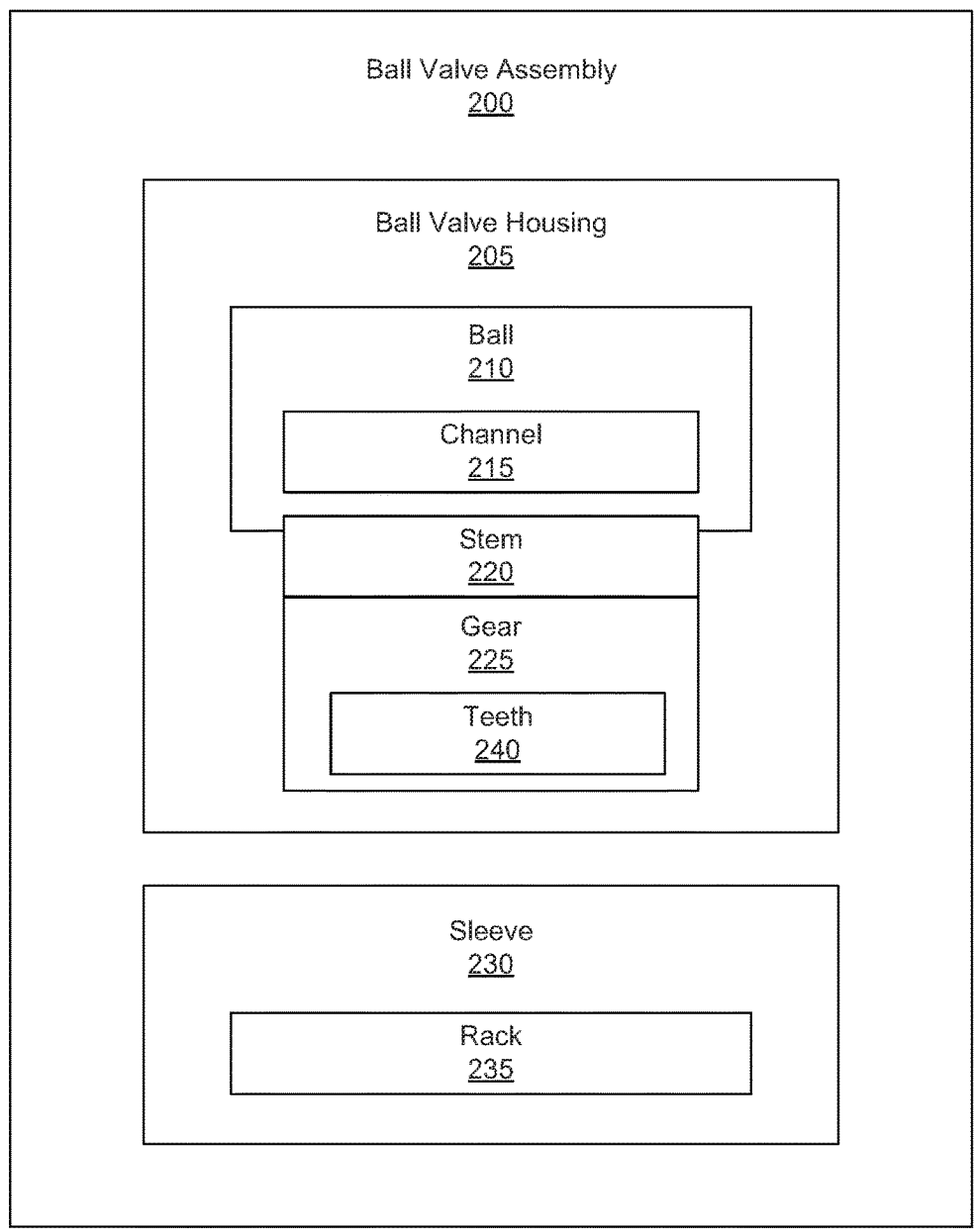
FIG. 4 is a block diagram of a ball valve assembly according to an example of the principles described herein.

FIG. 4 is a block diagram of a ball valve assembly (200) according to an example of the principles described herein. The valve assembly (200) may include similar features as that presented herein in connection with the valve described and shown in FIG. 1. Specifically, the ball valve assembly (200) may include a ball valve housing (205) that houses a ball (210). The ball (210) may include a channel (215) defined along a first axis of the ball (210) through which, when appropriately situated, allows a fluid to pass through the ball (210). the ball valve assembly (200) may further include a stem (220) coupled to the ball at a second axis perpendicular to the channel. In an example, the stem (220) is a separate part couplable to the ball (210) via a fastener. In an example, the stem (220) and ball (210) form a monolithic piece.

The ball valve assembly (200) may further include a gear (225) coupled to the stem (220) that is made to rotate as the ball (210) rotates. The gear (225) may include a number of teeth (240) that interface with a rack (235) of the sleeve (230) as described herein. During operation of the ball valve assembly (200), a user may rotate the sleeve (230) coaxially about the ball valve housing (205). As the sleeve (230) is rotated, the rack (235) causes the gear (225) to rotate. In an example, the rack (235) and the gear (225) may interact with each other similar to a rack and pinion system.

The rotation of the gear (225) causes the ball (205) to also rotate within the ball valve housing (205) such that the channel (215) may be selectively aligned with the flow of fluid through the ball valve assembly (200).

Figure 5:
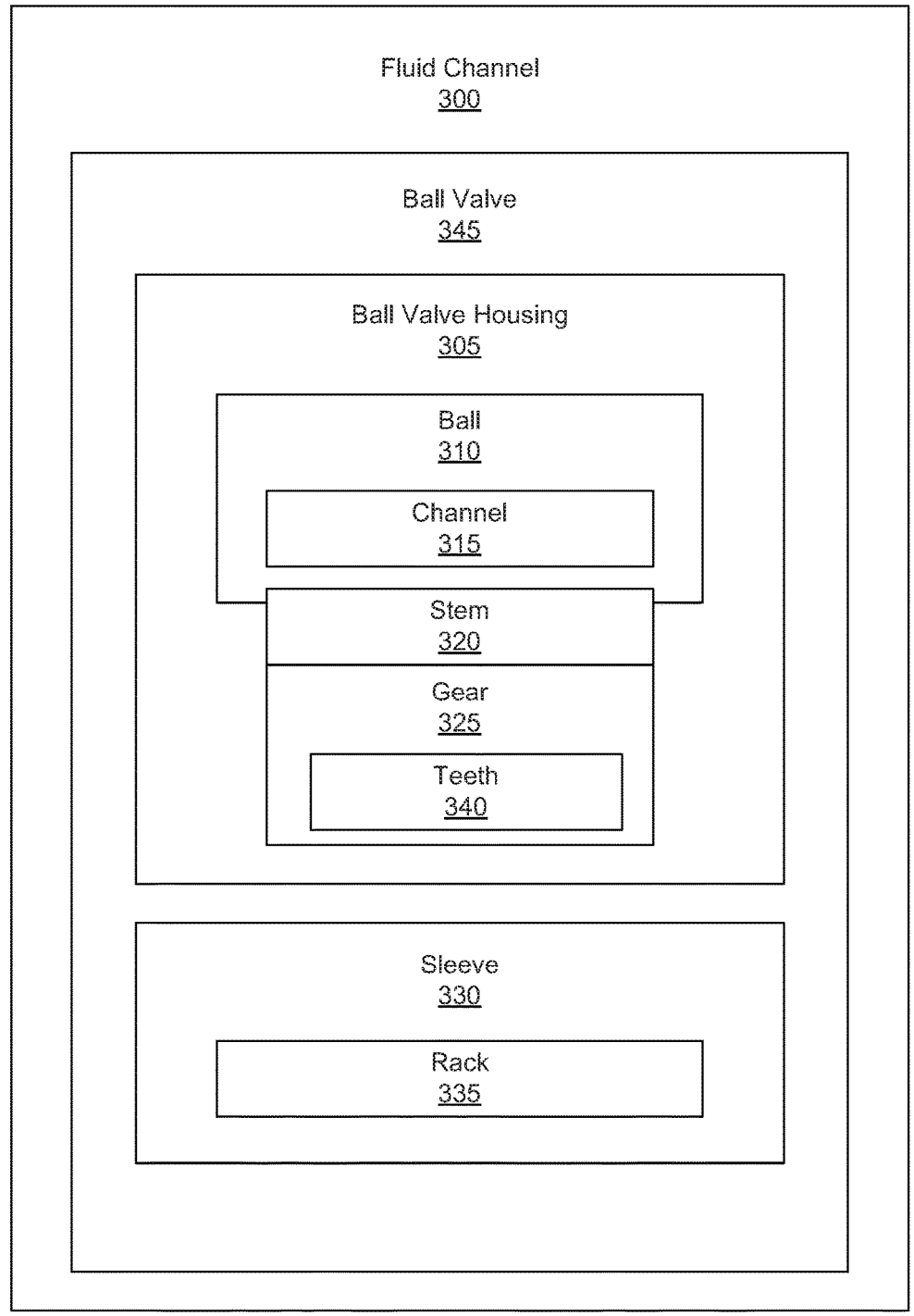
FIG. 5 is a block diagram of a fluid channel according to an example of the principles described herein.

FIG. 5 is a block diagram of a fluid channel (300) according to an example of the principles described herein. The fluid channel (300) may include similar features as that presented herein in connection with the valve described and shown in FIGS. 1 and 4. Specifically, the fluid channel (300) may include a ball valve (345) that includes a ball valve housing (305) and a sleeve (330). The ball valve housing (305) may include a ball (310) with a channel (315) defined there though to selectively allow a fluid to pass through the ball valve (345) when the channel (315) is aligned with the fluid channel (300). The ball (310) may include a stem (320) coupled thereto with a gear (325) having teeth (340) coupled thereto. A rack (335) of the sleeve (330) may interact with the teeth (340) of the gear (325) in order to cause the ball (310) to rotate as described herein.

Additionally, in the examples presented herein, the fluid channel (300) may be fluidically coupled to a nozzle, a fluid pump, a gas torch, a bonnet, or any other device used downstream to further manipulate the flow of fluid provided by the fluid channel (300) and specifically the valve described herein.

Figure 6:
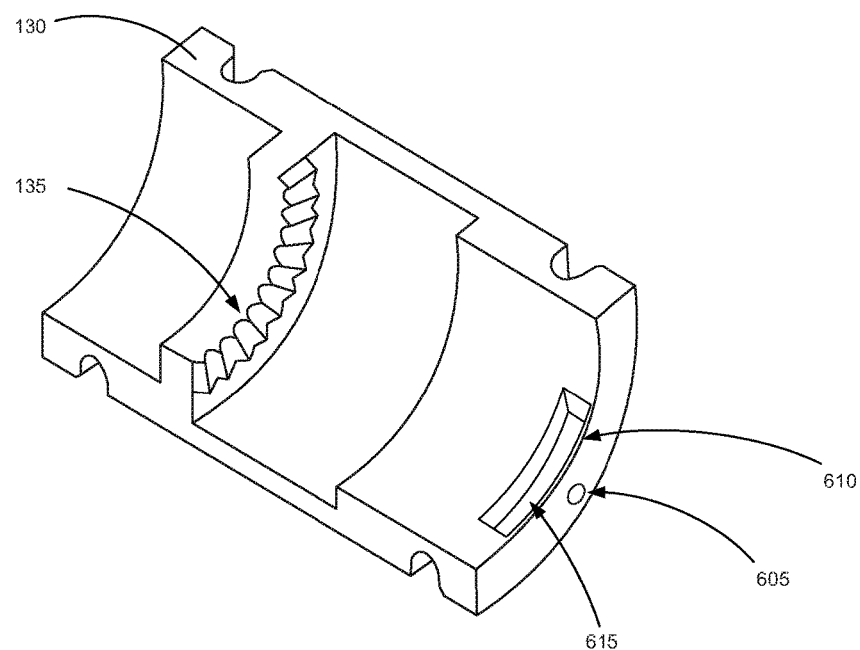
FIG. 6. is a perspective quarter-cut view of the sleeve described in FIG. 1 according to an example of the principles described herein.

FIG. 6. is a perspective quarter-cut view of the sleeve (130) described in connection FIG. 1 according to an example of the principles described herein. Again, the sleeve (130) may be made of a resilient material used to interface with the gear (FIGS. 2 and 3, 125) via a racked channel (135). The racked channel (135) may be defined into the interior surface of the sleeve (130) such that the teeth defining the racked channel (135) interface mechanically with the teeth of the gear (125). The sleeve (130) may also interface with the housing (FIGS. 2 and 3, 105) of the valve (FIG. 1, 100) with a number of raised domes (605) formed on each end of the sleeve (130). Any number of raised domes (605) may be formed on the ends of the sleeve (130) such that haptic feedback may be felt by the user as the sleeve (130) is rotated coaxially about the housing (FIGS. 2 and 3, 105). Much like the registration dimples (186) descried herein, the position of the raised domes (605) may indicate any number of positions of the ball (FIG. 1, 110) such that the user may know when fluid is flowing and how much the valve (FIG. 1, 100) has been opened. To provide the haptic feedback to the user, the raised domes (605) may interact with a number of dimples formed in the housing (105) and a deformable edge (610). The raised domes (605) may each be formed alongside a void (615) formed into the sleeve (130). The void (615) may or may not extend through the sleeve (130) but by forming the void (615), a deformable edge (610) is also formed. The deformable edge (610) may deform as the sleeve (130) and the raised domes (605) are not aligned with the dimples formed in the housing (105). When the raised domes (605) are aligned with the dimples formed in the housing (105), the deformable edge (610) is allowed to return to its formed position and haptic feedback is provided to the user as this occurs. Although the present specification describes the use of registration dimples (FIGS. 2 and 3, 186) or, alternatively, raised domes (605), any type of haptic feedback device may be used to allow a user to selectively open and close the valve (FIG. 1, 100) to any degree.

Figure 7:
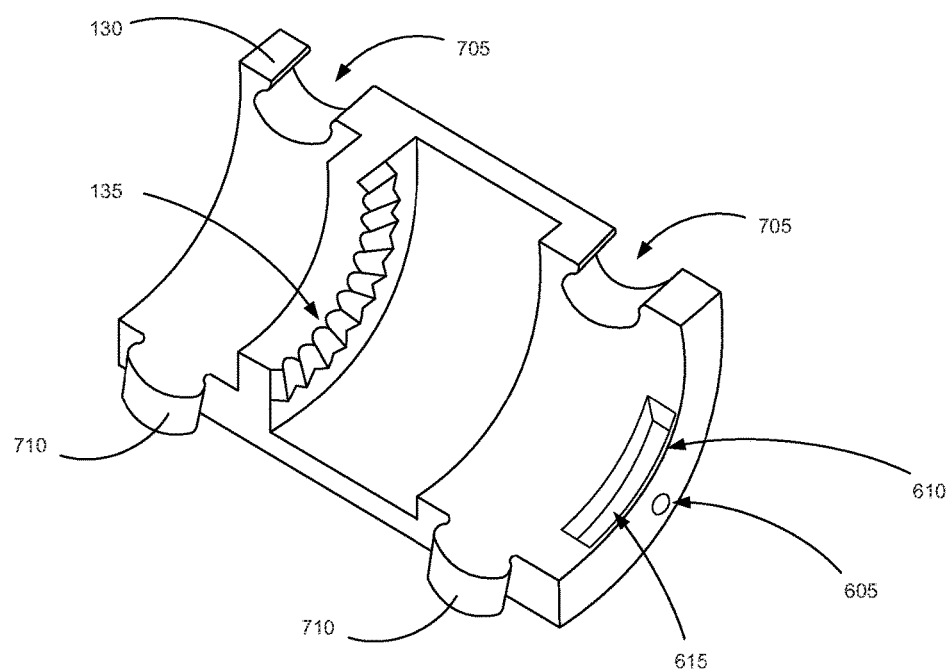
FIG. 7 is a half-cut perspective view of a sleeve (130) described in connection with FIG. 1 according to an example of the principles described herein.

FIG. 7 is a half-cut perspective view of a sleeve (130) described in connection with FIG. 1 according to an example of the principles described herein. In FIG. 7, the sleeve (130) may include a number of female ended snaps (705) and male ended snaps (710). In this example, instead of or in addition to the number of circlips (175) used to couple portions of the sleeve (130) together, the female ended snaps (705) may be snapped into the male ended snaps (710). The sleeve (130) may be divided into any number of portions. In an example, the sleeve (130) comprises two portions forming half cylinders such that the coupling of mating female ended snaps (705) and male ended snaps (710) couples the sleeve (130) portions together.

The specification and figures describe a valve that includes a sleeve that actuates the movement of a ball within the valve. This valve allows a user to hold onto the fluid channel at least partially defined by the valve thereby allowing better control by the user of the flow of fluid. During use, there is no control valve to break or bend during use thereby reducing the manpower and cost to operate the valve. Further, with the inclusion of a heat resistant layer on the sleeve, a relatively hot fluid may be passed through the valve without burning a user's hands. The valve further allows for ambidextrous use by any user. Additionally, where the presently described valve is placed on a fluid channel that runs along a wall, the placement of the stem and ball can be any radial location, even perpendicular to or against the wall. This is because the sleeve may be accessed at any location outside of the sleeve and the exact placement of the stem is not a deciding factor in the placement of the valve. This also prevents a plumber or other installer from over torquing the fitting between the valve and the piping in order to gain access to a ball actuator. Because there is no lever or other external actuator extending from the sleeve of the present valve, the valve may be properly fitted with the proper torque resulting in a relatively better installed valve. The valve also allows for 360 degrees tuning of the sleeve with, in some examples, indicators on the sleeve and housing of the valve indicating the position of the ball in the housing: open, close, and/or partially open. Haptic feedback is provided to the user in order to allow the user to feel when the ball within the housing has reached a certain position.

The preceding description has been presented to illustrate and describe examples of the principles described. This description is not intended to be exhaustive or to limit these principles to any precise form disclosed. Many modifications and variations are possible in light of the above teaching.

What is claimed is:

1. A valve, comprising:
   a housing;
   a ball having a channel passing therethrough, the ball housed within the housing;
   a stem extending out from a surface of the ball perpendicular to the channel;
   a gear coupled to the stem, the gear comprising a number of teeth; and
   a sleeve comprising a rack defined on an interior surface of the sleeve that interfaces with the teeth of the gear, the sleeve being parallel to a flow of fluid through the housing and external to the housing;
   wherein rotation of the sleeve coaxial to the flow of fluid through the housing causes the ball to rotate within the housing to prevent or allow a fluid to pass through the channel.

2. The valve of claim 1, further comprising a number of haptic feedback devices, the haptic feedback devices providing haptic feedback to a user indicating a rotational position of the sleeve relative to the housing.

3. The valve of claim 1, further comprising a number of circlips to couple the sleeve to the housing.

4. The valve of claim 1, wherein the sleeve comprises a heat resistant layer to prevent heat transfer through the sleeve.

5. The valve of claim 1, wherein the sleeve further comprises a number of female ended snaps and male ended snaps that couple portions of the sleeve around the housing.

6. The valve of claim 1, wherein the sleeve further comprises a number of dimples formed therein wherein the number of dimples interface with a number of ball bearings housed in the housing to provide haptic feedback to a user of the valve.

7. A ball valve assembly, comprising:
   a ball valve housing to house a ball, the ball comprising a channel defined along a first axis of the ball;
   a stem coupled to the ball at a second axis perpendicular to the channel;
   a gear coupled to the stem, the gear having a number of teeth; and
   a sleeve coaxially covering an exterior of the housing parallel to a flow of fluid through the housing, the sleeve comprising a rack to interface with the teeth of the gear;
   wherein rotation of the coaxial sleeve coaxially about the housing causes the ball to rotate within the housing to prevent or allow a fluid to pass through the valve.

8. The ball valve assembly of claim 7, further comprising a number of haptic feedback devices, the haptic feedback devices providing haptic feedback to a user indicating a rotational position of the sleeve relative to the ball valve housing.

9. The ball valve assembly of claim 7, further comprising a number of rails defined on the housing and a number of tracks defined on an inner surface of the sleeve, the rails interfacing with the tracks to cause the sleeve to remain rotatable about the housing.

10. The ball valve assembly of claim 7, further comprising a number of circlips to couple the sleeve to the housing.

11. The ball valve assembly of claim 7, wherein the sleeve comprises a heat resistant layer to prevent heat transfer through the sleeve.

12. The ball valve assembly of claim 11, wherein the sleeve further comprises a number of female ended snaps and male ended snaps that couple portions of the sleeve around the housing.

13. A fluid channel comprising:
   a ball valve, the ball valve comprising:
      a ball valve housing to house a ball, the ball comprising a channel defined along a first axis of the ball;
      a stem coupled to the ball at a second axis perpendicular to the channel;
      a gear coupled to the stem, the gear having a number of teeth; and
      a sleeve coaxially covering an exterior of the housing parallel to a flow of fluid through the housing, the sleeve comprising a rack to interface with the teeth of the gear; wherein rotation of the coaxial sleeve coaxially about the housing causes the ball to rotate within the housing to prevent or allow a fluid to pass through the valve.

14. The fluid channel of claim 13, further comprising a number of haptic feedback devices formed into the ball valve housing and sleeve, the haptic feedback devices providing haptic feedback to a user regarding the rotational position of the sleeve.

15. The fluid channel of claim 13, further comprising a number of rails defined on the housing and a number of tracks defined on an inner surface of the sleeve, the rails interfacing with the tracks to cause the sleeve to remain rotatable coaxially about the housing.

16. The fluid channel of claim 13, wherein the sleeve of made of a plurality of sleeve parts and wherein the sleeve parts comprise a number of snap posts to couple the plurality of sleeve parts together.

17. The fluid channel of claim 13, wherein the sleeve comprises a heat resistant layer to prevent heat transfer through the sleeve.

18. The fluid channel of claim 13, further comprising a number of raised dimples formed in the sleeve and a number of registration dimples formed into the ball valve housing wherein alignment of the raised dimples with the registration dimples provides haptic feedback to a user indicating the position of the ball within the ball valve housing.

* * * * *